United States Patent [19]

Kallaur

[11] 4,289,684
[45] Sep. 15, 1981

[54] SHEET MOLDING COMPOUND
[75] Inventor: Michael Kallaur, Grafton, Wis.
[73] Assignee: Freeman Chemical Corporation, Port Washington, Wis.
[21] Appl. No.: 143,802
[22] Filed: Apr. 23, 1980
[51] Int. Cl.³ ............... C08L 67/06; C08L 63/02; C08L 75/06
[52] U.S. Cl. ................... 260/40 R; 525/28
[58] Field of Search ............... 525/920, 28; 260/40 R
[56] References Cited
U.S. PATENT DOCUMENTS

| | | | |
|---|---|---|---|
| 3,531,364 | 9/1970 | Schmidle | 525/127 |
| 3,677,920 | 7/1972 | Kai | 525/28 |
| 3,933,728 | 1/1976 | Henbest | 525/28 |
| 3,975,457 | 8/1976 | Chang | 525/920 |
| 4,073,828 | 2/1978 | Ferrarini | 525/28 |
| 4,129,641 | 12/1978 | Ferrarini | 525/455 |

Primary Examiner—Paul Lieberman

[57] ABSTRACT

Sheet molding compound is prepared from unsaturated polyester resin syrup, particulate fillers, randomly oriented reinforcing fibers, a polyhydroxy polyacrylate or polyhydroxy polymethacrylate and an organic polyisocyanate. At the time of manufacturing the sheet molding compound, the organic diisocyanate combines with the polyhydroxy polyacrylate or polyhydroxy polymethacrylate to thicken the sheet molding compound without causing polymerization of the unsaturated polyester resin syrup.

4 Claims, No Drawings

SHEET MOLDING COMPOUND

BACKGROUND OF THE INVENTION

1. Field of the Invention

This invention relates to sheet molding compounds which are thickened mixtures of unsaturated polyester resin syrup, particulate fillers, reinforcing fibers, curing catalysts which remain polymerizable in sheet form. Sheet molding compounds are employed in manufacturing glass-fiber-reinforced thermoset products by compression in heated molds. Sheet molding compounds are frequently abbreviated as SMC.

2. Description of the Prior Art

Many techniques have been developed for hardening polymerizable unsaturated polyester resin syrups and reinforcing fibers without concomitantly polymerizing the unsaturated polyester resin syrup. Inorganic additives such as magnesium oxide, calcium oxide have been employed. Free maleic anhydride has been added to the compositions. Sheet molding compounds permit convenient handling of the polymerizable substance which can be introduced into heated molding elements and therein converted into thermoset fiber-reinforced products. When sheet molding compounds are employed, there is no need to introduce fibrous reinforcing materials separately into a mold cavity and also to introduce liquid polymerizable resin separately into the mold cavity. Sheet molding compounds greatly accelerate the production of glass-fiber-reinforced thermoset resinous products.

Preparation of sheet molding compounds confronts a variety of problems. One problem is that the thickening of the unpolymerized polymerizable resin may continue beyond the desired level and the resulting SMC is too hard, too brittle or otherwise unacceptable. Another problem is that inadequate thickening may occur and the resulting SMC never fully hardens to a handleable form. A further difficulty is that the hardening of the SMC takes place too slowly whereby excessive processing time is required to manufacture the SMC. A still further problem with the SMC is that the hardening process may continue at a retarded rate, requiring that such materials be used promptly and thus restricting the storage life of the SMC. The addition of diisocyanates to unsaturated polyester resins in sheet molding compounds has been described: U.S. Pat. Nos. 3,824,201; 3,933,728.

SUMMARY OF THE INVENTION

Sheet molding compound, prepared from unsaturated polyester resin syrup, particulate fillers, fibrous reinforcing material, free radical initiators, and, usually, low profile thermoplastic resinous additives, can be improved by addition of a polyhydroxy polyacrylate or polyhydroxy polymethacrylate, and an organic diisocyanate. The reaction between the organic polyisocyanate and the polyhydroxy polyacrylate or polyhydroxy polymethacrylate creates the desired thickening of the SMC without initiating significant vinyl condensation reactions. The organic diisocyanate supplies 0.3 to 0.9 NCO groups for each hydroxyl group in the resin system, i.e., in the unsaturated polyester and in the polyacrylate or polyhydroxy polymethacrylate. The polyhydroxy polyacrylate or polyhydroxy polymethacrylate may comprise from 10 to 80 percent by weight of the total unsaturated polyester ingredient.

Thus the overall polymerizable ingredients in the sheet molding compound are:

I. Unsaturated polyester resin and copolymerizable monomer wherein
  (A) The unsaturated polyester resin is a reaction product of polyols and polycarboxylic acids, at least a portion of which contains alpha-beta ethylenic unsaturation and which has a low acid value, e.g., less than 25; and
  (B) Copolymerizable monomer containing a terminal vinyl group such as styrene, divinylbenzene, alphamethyl styrene, alkylacrylates or methacrylates, ethylene glycol dimethacrylate, and the like;

II. A polyhydroxy polyacrylate or polyhydroxy polymethacrylate which is preferably the reaction product of acrylic acid or methacrylic acid and diglycidyl compounds such as the diglycidyl ether of bisphenol-A or the polyglycidyl ether of phenyl formaldehyde resins. Such products are described in U.S. Pat. Nos. 3,301,743 and 3,373,075.

III. Organic diisocyanate—Useful materials are those having a NCO equivalent weight of 100 to 300. Preferred diisocyanates are prepolymers of diisocyanates with diols such as glycols, diol ethers and diol esters.

IV. Other ingredients—Sheet molding compounds also contain particulate fillers, reinforcement fibers, a free radical initiator, mold release agents, in proportions which are well known in the art. The SMC also requires a catalyst for the reaction of NCO radicals with OH radicals, e.g., dibutyl tin dilaurate, stannous octoate.

Proportions

The unsaturated polyester plus the copolymerizable monomer comprises from 10 to 80 weight percent of the resinous ingredients. The polyhydroxy polyacrylate or polymethacrylate is from 10 to 80 weight percent of the resinous ingredients. The organic diisocyanate is present in sufficient quantity to supply 0.3 to 0.9 NCO radicals for each hydroxyl radical in the resin ingredients.

(F) DESCRIPTION OF THE PREFERRED EMBODIMENTS

Example 1

Preparation of a low acid value unsaturated polyester resin 40 mols dicyclopentadiene and 66 mols water are heated with 60 mols maleic anhydride at 160° F. The resin exotherms to about 225°–250° F. Thereafter 80 mols ethylene glycol, 10 mols diethylene glycol and 40 mols phthalic anhydride are added and the resulting mixture is heated to 375°–400° F. over a period of several hours until the resulting acid value is in the range of 10-25. Thereafter 7 parts by weight of the resulting resin are combined with 3 parts by weight styrene. The resulting unsaturated polyester resin syrup exhibits an SPI gel time of 3 to 6.5 minutes.

The product is identified herein as the unsaturated polyester resin syrup of Example 1.

Example 2

Preparation of polyhydroxy polymethacrylate

One epoxy equivalent of diglycidyl ether of bisphenol-A (epoxy equivalent weight, 172–176) is combined with 1.03 equivalents of methacrylic acid. The ingredients are heated in the presence of an appropriate catalyst (one percent by weight of a mixture of 3 parts by weight triphenyl stibine and one part by weight triphenyl phosphine). The ingredients are heated to about 210° F. over several hours until the acid value diminishes to the range of 5–10.

This reaction product is identified herein as the polyhydroxy polymethacrylate of Example 2.

Example 3

Preparation of SMC resin vehicle

A resin vehicle is prepared by combining 49.1 parts by weight of the polyhydroxy polymethacrylate of Example 2; 21 parts by weight styrene; 29.9 parts by weight of the unsaturated polyester resin syrup of Example 1. That resin vehicle is hereafter identified as the resin vehicle of Example 3.

Example 4

Preparation of an SMC formulation 54.7 parts by weight of the resin vehicle of Example 3 are combined with 23.4 parts by weight of a low profile additive which is a solution of 40 parts by weight polystyrene in 60 parts by weight styrene; as a catalyst, 0.7 parts by weight t-butyl perbenzoate is added. 2.7 parts by weight zinc stearate is added as a mold release agent. 103 parts by weight of powdered calcium carbonate is added as a filler. 21.9 parts by weight of a polyisocyanate prepolymer (hereinafter more fully described) is added along with 0.09 parts by weight of dibutyl tin dilaurate which is a catalyst for the reaction of NCO groups with hydroxyl groups.

The SMC formulation comprises 43 parts by weight of randomly oriented one inch long glass fibers and 57 parts by weight of the above-described formulation. The glass fibers were Owens Corning Fiberglas 433 glass roving containing 15 individual strands of glass.

The diisocyanate prepolymer is a commercially available prepolymer of polymethylene polyphenyl diisocyanate and triethylene glycol having an NCO value of 2.0.

Example 6

Preparation of the SMC

The SMC formulation described in EXAMPLE 5 was shaped between doctor blades set at 0.048 inches to produce 18 inch wide sheet molding compound between two sheets of polyethylene film. The glass fiber density was 192 grams per square foot within the SMC.

The SMC had a viscosity of 44 million centipoises after two days; 88 million centipoises after ten days. The product was cured in a commercial mold at a temperature of 300° F. for three minutes. The resulting polymerized product was tested at room temperature and at 90° C. The tensile strength of ten samples range from 19,800 PSI to 23,700 PSI. The tensile modulus ranged from 2.00 to 3.49.

For ten samples tested at 90° C. the tensile strength ranged from 16,600 PSI to 21,700 PSI. The tensile modulus ranged from 0.92 to 1.90. Final tests on the panels indicated that one panel had a glass content of 42 percent glass and exhibited 85 percent strength retention when the room temperature results were compared to the 90° C. results. The other panel had 44 percent glass content and exhibited 90 percent strength retention when the room temperature results were compared to the 90° C. results.

GENERAL PARAMETERS

Unsaturated Polyester Resin

The unsaturated polyester resin for use in the present SMC formulation should have a low hydroxyl content and adequate reactivity for prompt polymerization. In general the unsaturated polyester resin is the reaction product of a polyol such as a diol and a polycarboxylic acid or acid anhydride preferably a dicarboxylic acid or anhydride at least a portion of which contains alpha-beta ethylenic unsaturation. The hydroxyl content of the unsaturated polyester resin can be reduced by initially capping a portion of the dicarboxylic acid ingredient with dicyclopentadiene, as in EXAMPLE 1, or with an alcohol. Typical polyols are well known in the preparation of unsaturated polyester resins and include ethylene glycol, diethylene glycol, polyethylene glycol, propylene glycol, dipropylene glycol, polypropylene glycol, butane diol, neopentyl glycol, and the like. Typical polycarboxylic acids include phthalic acid, orthophthalic acid, orthophthalic anhydride, terephthalic acid, azelaic acid, adipic acid, endomethylenetetrahydrocarboxylic acid, chlorendic acid or anhydride, maleic acid or anhydride, fumaric acid, and the like. Alkylene oxides may be employed in place of the polyols if desired.

Polyhydroxy Polyacrylate or Polyhydroxy Polymethacrylate

Preferred polyhydroxy polyacrylates are the reaction products of acrylic acid or methacrylic acid with polyglycidyl ethers such as the diglycidyl ether of bisphenol-A; the polyglycidyl ether of phenyl formaldehyde resin; diglycidyl aliphatic ethers. The same polyhydroxy polyacrylate can be prepared by reacting diglycidyl ethers of acrylic or methacrylic acid with diols such as bisphenol-A; phenol-formaldehyde novolac resins; aliphatic diols.

Organic Diisocyanate

Any low volatile organic diisocyanate is useful in preparing the SMC formulation. Preferred diisocyanates are prepolymers of organic diisocyanates and diols.

I claim:

1. A polymerizable composition of matter which becomes thickened without concomitant gelation and which can be subsequently polymerized from its thickened state to a thermoset mass, said composition comprising:
   (A) a resin component comprising:
      (1) an unsaturated polyester resin having an acid value less than 25, an ethylenically unsaturated monomer copolymerizable therewith and a free radical initiator, these materials comprising from 10–80 weight percent of said resin component;
      (2) a polyhydroxy polyacrylate or polyhydroxy polymethacrylate which is a reaction product of an ethylenically unsaturated monomarboxylic acid and a polyepoxide comprising 10–80 weight percent of said resin component;
      (3) an organic diisocyanate in an amount sufficient to supply 0.3 to 0.9 NCO radicals for each hydroxyl radical present in said resin component and a catalyst for the reaction of NCO radicals and hydroxyl radicals; and (B) a quantity of randomly oriented reinforcing glass fibers.

2. The composition of claim 1 wherein the said unsaturated polyester resin is capped with dicyclopentadiene to achieve a low hydroxyl value.

3. The composition of claim 1 wherein the said organic diisocyanate is a prepolymer of polyphenyl polymethylene diisocyanate and an organic diol.

4. The composition of claims 1, 2 or 3 wherein the said polyhydroxy polyacrylate or polyhydroxy methacrylate is the reaction product, essentially free of unreacted epoxy groups of a polyepoxide resin and acrylic or methacrylic acid.

* * * * *

UNITED STATES PATENT AND TRADEMARK OFFICE
CERTIFICATE OF CORRECTION

PATENT NO. : 4,289,684
DATED : September 15, 1981
INVENTOR(S) : Michael Kallaur

It is certified that error appears in the above-identified patent and that said Letters Patent are hereby corrected as shown below:

At column 4, line 62, the "monomarboxylic" should be

--- monocarboxylic --- .

Signed and Sealed this

First Day of December 1981

[SEAL]

Attest:

GERALD J. MOSSINGHOFF

Attesting Officer        Commissioner of Patents and Trademarks